United States Patent
Brunet et al.

(10) Patent No.: US 11,880,441 B2
(45) Date of Patent: Jan. 23, 2024

(54) SYSTEM AND METHOD FOR INTER-INDIVIDUAL DISCRIMINATION BASED ON OCULOMOTOR KINEMATICS

(71) Applicant: THE RESEARCH FOUNDATION FOR THE STATE UNIVERSITY OF NEW YORK, Albany, NY (US)

(72) Inventors: Nicolas Brunet, Brooklyn, NY (US); Susana Martinez-Conde, Brooklyn, NY (US); Stephen Macknik, Brooklyn, NY (US); Robert Alexander, Brooklyn, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 521 days.

(21) Appl. No.: 17/271,220

(22) PCT Filed: Aug. 26, 2019

(86) PCT No.: PCT/US2019/048144
§ 371 (c)(1),
(2) Date: Feb. 25, 2021

(87) PCT Pub. No.: WO2020/046815
PCT Pub. Date: Mar. 5, 2020

(65) Prior Publication Data
US 2021/0248348 A1      Aug. 12, 2021

Related U.S. Application Data

(60) Provisional application No. 62/722,951, filed on Aug. 26, 2018.

(51) Int. Cl.
*G06F 21/32*      (2013.01)
*G06N 20/00*     (2019.01)
(Continued)

(52) U.S. Cl.
CPC ............ *G06F 21/32* (2013.01); *G06F 18/214* (2023.01); *G06N 5/04* (2013.01); *G06N 20/00* (2019.01);
(Continued)

(58) Field of Classification Search
CPC ........ G06F 21/32; G06F 18/214; G06F 21/62; G06F 18/00; G06F 18/23213;
(Continued)

(56) References Cited

U.S. PATENT DOCUMENTS 7,630,524 B2    12/2009   Lauper et al.
8,675,925 B2     3/2014   Derakhshani et al.
(Continued)

OTHER PUBLICATIONS

Andreas Bulling et al., IEEE Transactions on Pattern Analysis and Machine Intelligence, Eye Movement Analysis for Activity Recognition Using Electrooculography, 2010, entire document. (Year: 2010).*

(Continued)

*Primary Examiner* — Brandon J Miller
(74) *Attorney, Agent, or Firm* — HESLIN ROTHENBERG FARLEY & MESITI P.C.

(57) ABSTRACT

Provided is a method of granting access, including compiling a training profile of each of two or more persons, wherein the training profile includes one or more oculomotor features exhibited during one or more tasks, associating a training profile of one of the two or more persons with a permission, detecting a testing profile of one of the two or more persons, wherein the testing profile includes one or more of the one or more oculomotor features exhibited by during one or more of the one or more tasks, identifying a target profile, granting access if and only if the target profile is associated with the permission, wherein the one or more tasks are selected from fixation, saccade speed, saccade (Continued)

accuracy, visually-guided saccades, anti-saccades, memory-guided saccades, free viewing, pursuit.

21 Claims, 6 Drawing Sheets

(51) Int. Cl.
  *G06N 5/04* (2023.01)
  *G06V 40/18* (2022.01)
  *G06F 18/214* (2023.01)
  *G06F 21/62* (2013.01)

(52) U.S. Cl.
  CPC .......... *G06V 40/193* (2022.01); *G06V 40/197* (2022.01); *G06F 21/62* (2013.01)

(58) Field of Classification Search
  CPC .... G06F 18/24147; G06N 5/04; G06N 20/00; G06V 40/193; G06V 40/197
  See application file for complete search history.

(56) References Cited

U.S. PATENT DOCUMENTS

| | | |
|---|---|---|
| 8,856,541 B1 | 10/2014 | Chaudhury et al. |
| 2007/0092115 A1 | 4/2007 | Usher et al. |
| 2013/0336547 A1 | 12/2013 | Komogortsev |
| 2014/0044318 A1 | 2/2014 | Derakhshani et al. |
| 2014/0362091 A1* | 12/2014 | Bouaziz .................. G06T 7/292 345/473 |
| 2015/0294149 A1 | 10/2015 | Palti-Wasserman et al. |
| 2016/0019410 A1* | 1/2016 | Komogortsev ........ A61B 5/165 382/117 |
| 2016/0062459 A1 | 3/2016 | Publicover et al. |

OTHER PUBLICATIONS

International Search Report and Written Opinion of the International Searching Authority for International Application No. PCT/US2019/048144 dated Nov. 4, 2019.

Brunet, N. et al., "061.20 / JJ1—An oculomotor signature as a fraud resistant tool for biometric identity verification", Session 061—Eye Movements and Perception, Abstract Only, Nov. 3, 2018, https://www.abstractsonline.com/pp8/#!/4649.

Darwish, A., et al., "Biometric Identification Using the Dynamic Features of the Eyes", IEEE Sixth International Conference on Biometrics: Theory: Applications and Systems (BTAS), Abstract Only, Sep. 29-Oct. 2, 2013, https://ieeexplore.ieee.org/document/6712724/.

Eberz, S., et al., "Looks Like Eve: Exposing Insider Threats Using Eye Movement Biometrics", ACM Transactions on Privacy and Security, vol. 19, No. 1, Article 1, pp. 1-31 (2016).

Holland, C. et al., "Complex Eye Movement Pattern Biometrics: The Effects of Environment and Stimulus", IEEE Transactions of Information Forensics and Security—Pre Print, pp. 1-12 (2014), https://ieeexplore.ieee.org/document/6634262.

* cited by examiner

SYSTEM AND METHOD FOR INTER-INDIVIDUAL DISCRIMINATION BASED ON OCULOMOTOR KINEMATICS

CROSS-REFERENCE TO RELATED APPLICATIONS

This application is a national stage filing under 35 U.S.C. § 371 of International Application No. PCT/US2019/048144, filed on Aug. 26, 2019 and published as WO 2020046815 on Mar. 5, 2020, and claims benefit of priority from U.S. Provisional Patent Application No. 62/722,951, filed Aug. 26, 2018. The entire contents of each of the said applications are incorporated herein by reference in their entireties.

FIELD

The present disclosure pertains to a method and system for identifying subjects, such as individual persons, and discriminating between subjects via a digital computer interface. More particularly, provided are a method and system for discriminating between subjects and identifying subjects via computer by detecting and measuring eye movements.

BACKGROUND

A shortcoming of using digital technology for identifying subjects (such as individual persons) and discriminating between them is a vulnerability to identity theft. There is a need for an approach to authenticate an individual before granting him or her access to personal and/or sensitive information less susceptible to hacking or other trickery. Retina scans, voice recognition, and face recognition are examples of biometric identifiers. Unfortunately, most of those biometrics show significant shortcomings. Voice recognition systems can for instance be fooled by tape recordings. Digital face recognition can also be circumvented by means for duplicating an individual's face or image thereof. There is therefore a need for an improved method and system for discriminating between individuals and identifying individuals via digital recognition mechanisms.

One possible feature for identifying individuals involves measuring individuals' eye movements. Previous attempts to use eye movement features for biometric identification consist of measuring various saccade features while participants were directing their gaze towards a jumping point stimulus (Komogortsev et al. 2010), watching a movie (Kinnunen et al., 2010), or facial images (Rigas et al., 2012); or comparing eye's scan path behavior during reading (Holland and Komogortsev, 2011). However, fixational eye movements as a component of an oculomotor signature have not been so employed. Fixational eye-movements, including tiny eye-movements that occur unconsciously, might be the most crucial and reliable component necessary to establish an accurate individual recognition method and system. Measuring tiny fixational eye-movements may involve high resolution eyetrackers. Improvements in inter-individual discrimination and individual recognition via a digital recognition method and system are therefore needed.

SUMMARY

In an aspect, provided is a method of granting access, including compiling a training profile of each of two or more subjects, wherein the training profile includes one or more oculomotor features exhibited during one or more tasks, associating a training profile of one of the two or more subjects with a permission, detecting a testing profile of one of the two or more subjects, wherein the testing profile includes one or more of the one or more oculomotor features exhibited during one or more of the one or more tasks, identifying a target profile, wherein the target profile is the training profile of the one or more subjects closest to the testing profile, wherein identifying includes performing a k-nearest neighbor analysis and k=1, and granting access if and only if the target profile is associated with the permission, wherein the one or more tasks are selected from fixation, saccade speed, saccade accuracy, visually-guided saccades, anti-saccades, memory-guided saccades, free viewing, pursuit, and any combination of two or more of the foregoing, and detecting includes observing features wherein features are selected from one or any combination of two or more fixation features if one of the one or more tasks includes fixation, one or any combination of two or more saccade speed features if one of the one or more tasks includes saccade speed, one or any combination of two or more saccade accuracy features if one of the one or more tasks includes saccade accuracy, one or any combination of two or more visually-guided saccades features if one of the one or more tasks includes visually-guided saccades, one or any combination of two or more anti-saccades features if one of the one or more tasks includes anti-saccades, one or any combination of two or more memory-guided saccades features if one of the one or more tasks includes memory-guided saccades, one or any combination of two or more free viewing features if one of the one or more tasks includes free viewing, and one or any combination of two or more pursuit features if one of the one or more tasks includes pursuit.

In an embodiment, one or more of the tasks includes fixation. In another example, one or more of the tasks includes saccade speed. In another example, one or more of the tasks includes saccade accuracy. In another example, one or more of the tasks includes visually-guided saccades. In another example, one or more of the tasks includes anti-saccades. In another example, one or more of the tasks includes memory guided saccades. In another example, one or more of the tasks includes free viewing. In another example, one or more of the tasks includes pursuit. In another embodiment, the one or more tasks include fixation, saccade speed, saccade accuracy, visually-guided saccades, anti-saccades, memory-guided saccades, free viewing, and pursuit.

In yet another embodiment, each of the one or more tasks has a training duration and a testing duration and the training duration and the testing duration of one or more of the tasks is between two seconds and three minutes.

In a further embodiment, the task has a testing duration and the testing duration is between one minute and three minutes. In a still further embodiment, the task has a testing duration and the testing duration is between thirty seconds and one minute. In yet a further embodiment, the task has a testing duration and the testing duration is between ten seconds and thirty seconds. In another embodiment, the task has a testing duration and the testing duration is between two seconds and ten seconds.

In another embodiment, granting access includes unlocking a computing device, unlocking a door, starting a device, displaying permission-protected information on a screen, or enabling use of a permission-protected application on a computing device.

In another aspect, provided is a system for performing the above-described method including a device for measuring eye movement, a memory for storing the training profiles and testing profile, and a computer for determining the one or more oculomotor features and identifying the target profile.

In another aspect, provided is a method of attributing an identity to a subject, including compiling a training profile of each of a test subject and one or more training subjects, wherein each training profile comprises one or more oculomotor features exhibited by the each of the test subject and the one or more training subjects during one or more tasks, associating each of the training profiles of the test subject and one or more training subjects with an identity, detecting a testing profile of the test subject, wherein the testing profile includes one or more of the one or more oculomotor features exhibited during one or more of the one or more tasks, identifying a target profile, wherein the target profile is the training profile of the test subject and one or more training subjects closest to the testing profile, wherein identifying includes performing a k-nearest neighbor analysis and k=1, and attributing the identity associated with the target profile with the test subject, wherein the one or more tasks are selected from fixation, saccade speed, saccade accuracy, visually-guided saccades, anti-saccades, memory-guided saccades, free viewing, pursuit, and any combination of two or more of the foregoing, and detecting includes observing features wherein features are selected from one or any combination of two or more fixation features if one of the one or more tasks includes fixation, one or any combination of two or more saccade speed features if one of the one or more tasks includes saccade speed, one or any combination of two or more saccade accuracy features if one of the one or more tasks includes saccade accuracy, one or any combination of two or more visually-guided saccades features if one of the one or more tasks includes visually-guided saccades, one or any combination of two or more anti-saccades features if one of the one or more tasks includes anti-saccades, one or any combination of two or more memory-guided saccades features if one of the one or more tasks includes memory-guided saccades, one or any combination of two or more free viewing features if one of the one or more tasks includes free viewing, one or any combination of two or more pursuit features if one of the one or more tasks includes pursuit, and any combination of two or more of the foregoing.

In an example, one or more of the tasks includes fixation. In another example, each of the one or more tasks has a training duration and a testing duration and the training duration and the testing duration of one or more of the tasks is between two seconds and three minutes. In another example, the task has a testing duration and the testing duration is between one minute and three minutes. In another example, the task has a testing duration and the testing duration is between thirty seconds and one minute. In another example, the task has a testing duration and the testing duration is between ten seconds and thirty seconds. In another example, the task has a testing duration and the testing duration is between two seconds and ten seconds.

In another example, one or more of the tasks includes saccade speed. In another example, each of the one or more tasks has a training duration and a testing duration and the training duration and the testing duration of one or more of the tasks is between two seconds and three minutes. In another example, the task has a testing duration and the testing duration is between one minute and three minutes. In another example, the task has a testing duration and the testing duration is between thirty seconds and one minute. In another example, the task has a testing duration and the testing duration is between ten seconds and thirty seconds. In another example, the task has a testing duration and the testing duration is between two seconds and ten seconds.

In another example, one or more of the tasks includes saccade accuracy. In another example, each of the one or more tasks has a training duration and a testing duration and the training duration and the testing duration of one or more of the tasks is between two seconds and three minutes. In another example, the task has a testing duration and the testing duration is between one minute and three minutes. In another example, the task has a testing duration and the testing duration is between thirty seconds and one minute. In another example, the task has a testing duration and the testing duration is between ten seconds and thirty seconds. In another example, the task has a testing duration and the testing duration is between two seconds and ten seconds.

In another example, one or more of the tasks includes visually-guided saccades. In another example, each of the one or more tasks has a training duration and a testing duration and the training duration and the testing duration of one or more of the tasks is between two seconds and three minutes. In another example, the task has a testing duration and the testing duration is between one minute and three minutes. In another example, the task has a testing duration and the testing duration is between thirty seconds and one minute. In another example, the task has a testing duration and the testing duration is between ten seconds and thirty seconds. In another example, the task has a testing duration and the testing duration is between two seconds and ten seconds.

In another example, one or more of the tasks includes anti-saccades. In another example, each of the one or more tasks has a training duration and a testing duration and the training duration and the testing duration of one or more of the tasks is between two seconds and three minutes. In another example, the task has a testing duration and the testing duration is between one minute and three minutes. In another example, the task has a testing duration and the testing duration is between thirty seconds and one minute. In another example, the task has a testing duration and the testing duration is between ten seconds and thirty seconds. In another example, the task has a testing duration and the testing duration is between two seconds and ten seconds.

In another example, one or more of the tasks includes memory guided saccades. In another example, each of the one or more tasks has a training duration and a testing duration and the training duration and the testing duration of one or more of the tasks is between two seconds and three minutes. In another example, the task has a testing duration and the testing duration is between one minute and three minutes. In another example, the task has a testing duration and the testing duration is between thirty seconds and one minute. In another example, the task has a testing duration and the testing duration is between ten seconds and thirty seconds. In another example, the task has a testing duration and the testing duration is between two seconds and ten seconds.

In another example, one or more of the tasks includes free viewing. In another example, each of the one or more tasks has a training duration and a testing duration and the training duration and the testing duration of one or more of the tasks is between two seconds and three minutes. In another example, the task has a testing duration and the testing duration is between one minute and three minutes. In another example, the task has a testing duration and the testing duration is between thirty seconds and one minute. In another example, the task has a testing duration and the testing duration is between ten seconds and thirty seconds.

In another example, the task has a testing duration and the testing duration is between two seconds and ten seconds.

In another example, one or more of the tasks includes pursuit. In another example, each of the one or more tasks has a training duration and a testing duration and the training duration and the testing duration of one or more of the tasks is between two seconds and three minutes. In another example, the task has a testing duration and the testing duration is between one minute and three minutes. In another example, the task has a testing duration and the testing duration is between thirty seconds and one minute. In another example, the task has a testing duration and the testing duration is between ten seconds and thirty seconds. In another example, the task has a testing duration and the testing duration is between two seconds and ten seconds.

In another example, the one or more tasks include fixation, saccade speed, saccade accuracy, visually-guided saccades, anti-saccades, memory-guided saccades, free viewing, and pursuit. In another example, each of the one or more tasks has a training duration and a testing duration and the training duration and the testing duration of one or more of the tasks is between two seconds and three minutes. In another example, the task has a testing duration and the testing duration is between one minute and three minutes. In another example, the task has a testing duration and the testing duration is between thirty seconds and one minute. In another example, the task has a testing duration and the testing duration is between ten seconds and thirty seconds. In another example, the task has a testing duration and the testing d In another aspect, provided is a system for performing the method of attributing an identity to a subject, including a device for measuring eye movement, a memory for storing the training profiles and testing profile, and a computer for determining the one or more oculomotor features and identifying the target profile.

DETAILED DESCRIPTION OF THE INVENTION

Provided is a method and system for identifying subjects and discriminating between subjects on the basis of classifying subjects based on a subject's eye-movements during various training tasks and subsequently comparing a subject's eye movements exhibited during such tasks to the classified training profiles. As disclosed herein, measuring specific eye movement-related features and creating profiles for subjects based on such movements permits subsequent identification of a subject, and differentiation of one subject from another, by subsequently measuring a subject's eye movements and comparing them to movements initially exhibited during a training session.

In one example, a classification system may be used wherein subjects' eye movements are assigned a profile following discriminator training on a task and a discriminator subsequently compares a subject's eye movements during a test task, e.g. a repetition of a task used for training the discriminator. An example of a discriminate that may be used is known as a k-nearest neighbor classifier, or a kNN. In a kNN, profiles are compiled for individuals representing their scores on one or more training tasks. Numerous subjects may be used to train a classifier, and multiple test sessions may be administered to each subject during classifier training. Subjects' scores, derived from measurements of a subject's eye movements during training, may be stored such as in a computer memory such as a hard drive, flash memory, etc.

Subsequently, a subject may again participate in a task during which eye movements are measured and assigned a score. A kNN discriminator may then compare the subject's test score to the training scores previously acquired by the discriminator and stored in memory. A kNN discriminator looks at a predetermined number, represented by k, of training scores that are closer to the test score than any of the other training scores. In an example, k may be 1, in which case the one closest training score closest to the testing score is identified by the kNN discriminator. In other examples, k may be more than 1 and an average of the k>1 training scores that are closest to the test score are identified. The kNN discriminator may then determine which of a majority of k>1 nearest neighbors belong to a given classification and determine that the test score belongs to such classification. A k>1 may be used, for example, where a training score from more than one training session per subject is used to train the discriminator.

A kNN discriminator with k up to the number of training sessions per subject may then be used. Often, k is an odd number for the prevention of ties. So, for example, k may equal up to the number of training sessions used per subject in training the discriminator, or could be one less if an even number of training sessions per subject is used. In some examples, a different number of training sessions per subject may be used to train the discriminator. In such cases, k may equal up to the fewest number of training sessions used for any subject whose features were scored for training the discriminator (or, where such lowest number of training sessions is an even number, one less than such lowest number of training sessions). In other examples, k could exceed the minimum number of training sessions or could exceed the maximum number of training sessions, whether or not a subject received the same number of training sessions as other subjects.

As disclosed herein, training a discriminator with subjects' various features related to eye movement during various tasks, ascribing a score to each such subject on the basis of such features, then subsequently measuring eye movement and determining the feature or some of the features to derive a testing score gives a very high accuracy rate for identifying the subject. That is, various measures related to eye movement differentiate between subjects and remain similar over time such that one subject's eye movement-related features can distinguish such individual from others according to a given discriminator.

Various eye tracking devices may be used for measuring oculomotor location and displacement over time or movement, in temporal coordination with various visual and/or other stimuli presented to a subject during a training or testing session. Example tracking devices for use with the present invention can include, but are not limited to, the EyeLink II by SR Research or other equivalent eye tracking systems such as the IVIEW™ HI-SPEED 1250 tracking system by SensoMotoric Instruments. Such devices can measure where each of a subject's eyes are located with reference to a reference point and thereby determine eye movement or lack thereof, or speed, etc.

Various tasks may be used as training tasks and/or testing tasks in accordance with the present invention. Eye location is measured during such tasks. In some examples, location may be measured at a frequency of 500 Hz, though in other examples measurements may be taken with a higher or lower frequency. Examples of tasks include fixation, saccade speed, saccade accuracy, visually-guided saccades, anti-saccades, memory-guided saccades, free viewing, and pursuit. One or any combination of two or more tasks may be used for training or for testing.

In an example, a fixation task may include testing of visual fixation to measure micro saccades, spontaneous nystagmus and gaze evoked nystagmus. Micro saccades are a fixational eye movement including small, jerk-like, involuntary eye movements, similar to miniature versions of voluntary saccades. They may occur during prolonged visual fixation (of at least several seconds) with an amplitude of from 2 to 120 arcminutes. As used herein, the term saccades as a measurement includes measurement of micro saccades. Stimulus presented may be a visual fixation spot or point over a background such as a gray background. A subject may then be instructed to fixate on the visual fixation spot as accurately as possible at various positions. A three-minute session may include six trials of 30 second durations each. For example, a fixation point may be presented at the center of a visual field, then to the left and/or to the right thereof (e.g., displace by 20 degrees), and above and/or below the center of the visual field (e.g., 15 degrees above/below), then again at the center of the visual field. The order may vary. In other examples, fixation at a higher or lower number of fixation points may be measured, at different displacement angles. In an example, a 30 second trial may be performed at each of the foregoing locations, with two 30 second trials at the center of the visual field, for a total of six trials for a session length of approximately 3 minutes in total duration. Trials of shorter or longer duration may be used, and more or fewer than six total trials may be used.

In an example, saccade speed may include saccade velocity and intersaccadic intervals. Stimuli presented may be two fixation points or spots over a background, such as a gray background. For example, 20/15 degrees apart horizontally/vertically. A subject may then be instructed to look back and forth between the two fixation points as fast as possible. For example, two trials may be conducted for a session, such as two 50 second trials for a total session length of approximately two minutes in duration. A subject may then be instructed to first fixate on the center of the visual field then move their eyes to the left/right or upper/lower fixation point (depending on whether an up/down or left/right fixation pair is presented) and instructed to move their eyes from one fixation point to the other for the duration of the trial.

In an example, saccade accuracy may be ascertained by presentation of a fixation point over a background such as a gray background. A subject may then be instructed to track the fixation point as soon as it moves as accurately as possible. For example, each trial may include 1 second of fixation at the center of the visual field then the point moves, and after a second it moves back to the center of the visual field. For horizontal displacement the fixation point may move 5 degrees from center, then −5 degrees from center, then 10 degrees from center, then −10 degrees from center, then 15 degrees from center, then −15 degrees from center, then 20 degrees from center, then −20 degrees from center, then repeat the same pattern in reverse. A similar pattern of movement may then be used for vertical displacement except the maximum vertical displacement used may be 15/−15 degrees from center of the visual field. The foregoing may then be repeated, for a total session duration of approximately 2 minutes. Different durations than those described herein may also be used. Other examples may include different durations of fixation and at other fixation points (such as farther away from or closer to center).

Visually-guided saccades, anti-saccades, and memory-guided saccades ascertain cognitive control over saccades. In an example, for visually guided saccades: subjects may be instructed to fixate on a central fixation point. Then, the central fixation point may be switched off and a visual cue is presented in a pseudorandom position at, for example, 20° eccentricity, right or left of the central fixation point. Subjects may then be instructed to move their eyes directly and as accurately as possible to the cue as soon as it appears. After 1000 milliseconds, the cue may then be switched off and the central fixation point re-illuminated. After an inter-trial interval of 2500-3500 milliseconds the next trial begins. In other examples, different durations of cue presentation and inter-trial interval may also be used.

In an example, for antisaccade, subjects may be instructed to fixate on a central fixation point. Then the central fixation point may be switched off and after, in an example, 200 milliseconds ("gap") a visual cue may be presented at, for example, 20° eccentricity right or left of the central fixation point. Subjects may then be instructed to move their eyes in the direction opposite to the cue as soon as it appears. Subjects may not be given instructions for saccade accuracy. After 1000 ms, the cue may then be switched off and the central fixation point re-illuminated. After an inter-trial interval of 2500-3500 milliseconds the next trial may begin. Different gap durations or time frames before a cue is switched off may also be used.

In an example, for memory-guided saccade, subjects may fixate on a central fixation point. Then, a visual cue may be presented, for example, 100 milliseconds in one of 10, 12.5, 15, 17.5, or 20 degrees while subjects continue fixating on the central fixation point. After a delay of, for example, 5000 milliseconds the central fixation point may be switched off and subjects may be instructed to move their eyes directly and as accurately as possible to the remembered cue position. After, for example, 3000 milliseconds, the central fixation point is re-illuminated and after an inter-trial interval of, for example, 5000 milliseconds the next trial may begin. Different durations of delay, cue presentation, inter-trial interval, etc., may be used.

In an example, for visually-guided saccades, anti-saccades, and memory-guided saccade tasks, there may be 30 trials per session, with durations of 4 seconds, 4 seconds, and 13 seconds, respectively, yielding a total session duration of approximately 10.5 minutes. A different number of trials, of different durations, may also be used.

In an example, for the free viewing visual task, cognitive control of visual scanning may be ascertained. For example, an image, may be presented and a subject may then be instructed to visually explore the image for a duration of 20 seconds. For example, fifteen images may be presented per session giving a total session duration of approximately 5 minutes, for example. Different durations of image exploration, number of images presented, and session duration may also be used.

In an example, for the pursuit task, cerebellar control of smooth pursuit may be ascertained. For example, one fixation point may be presented over a background, such as a gray background. A subject may then be instructed to visually follow the fixation target as the fixation target moves within the field. For example, the target may move sinusoidally with an amplitude of 7.5 degrees with a frequency increasing from, for example, 0.5 Hz to 3 Hz every 10 seconds for a duration of 60 seconds (6 speeds), though other amplitudes, frequencies, and durations may also be used. The trial may be repeated a total of two times, yielding three, 60 second trials and a total session duration of 3 minutes. In other examples, a trial may be 40 seconds in duration and repeated a total of 2 times, for a total duration of 2 minutes. In some such examples, frequency may increase every 10 seconds for a total of 4 speeds or every 8 seconds for a total of 5 speeds. Other durations of speed per trial or total number of speeds may also be used.

During the foregoing training and testing tasks, eye location may be measured as a function of time. From such measurements, oculomotor features may be calculated to give a feature score. Different oculomotor features may be derived from different tasks. Fixation task features include fixation saccade rate (number of saccades made during attempted fixation divided by the amount of time of valid eye data), fixation saccade amplitude (median saccade amplitude of all saccades made during attempted fixation), fixation saccade horizontal direction bias (average (signed) horizontal component of saccades), fixation saccade vertical direction bias (average (signed) vertical component of saccades), fixation blink rate (number of blinks made during the recording divided by the duration of the recording), fixation blink duration (average duration of all blinks, fixation area (log area of ellipses containing 95% of eye positions), fixation horizontal direction bias asymmetry (asymmetry index between the direction bias looking to the left vs looking to the right), and fixation vertical direction bias asymmetry (asymmetry index between the direction bias looking up vs looking down). In some examples, all fixation tasks may be used during training, during testing, or during training and testing. In other examples, any combination of any two or more of the foregoing may be used in training, or testing, or both testing and training.

Saccade speed task features include speed horizontal number of saccades (number of saccades made during the horizontal trial), speed horizontal saccade error (average error of the horizontal saccades (unsigned)), speed horizontal saccade bias (average bias of the horizontal saccades (signed)), speed horizontal saccade speed (average saccade speed), speed horizontal main sequence slope (average saccade speed corrected for magnitude (slope of main sequence)), speed vertical number saccades (same as above but for vertical saccades), speed vertical saccade error (same as above but for vertical saccades), speed vertical saccade bias (same as above but for vertical saccades), speed vertical saccades speed (same as above but for vertical saccades), speed vertical main sequence slope (same as above but for vertical saccades), speed horizontal saccade inter-saccade interval fatigue (slope of the regression of inter-saccade interval durations over time for horizontal trials), and speed vertical saccade inter-saccade interval fatigue (slope of the regression of inter-saccade interval durations over time for vertical trials). In some examples, all saccade speed tasks may be used during training, during testing, or during training and testing. In other examples, any combination of any two or more of the foregoing may be used in training, or testing, or both testing and training.

Saccade accuracy task features include accuracy saccade error (average error for all saccades (unsigned error)), accuracy saccade bias (average bias for all saccades (signed error, projecting onto the direction of the target)), accuracy main sequence slope (slope of the main sequence for all saccades), accuracy horizontal saccade error (average error of the horizontal saccades), accuracy horizontal saccade bias (average bias of the horizontal saccades), accuracy vertical saccade error (average error of the vertical saccades), and accuracy vertical saccade bias (average bias of the vertical saccades). In some examples, all saccade accuracy tasks may be used during training, during testing, or during training and testing. In other examples, any combination of any two or more of the foregoing may be used in training, or testing, or both testing and training.

Visually-guided saccades, anti-saccades, and memory-guided saccade task features are visually guided reaction time (reaction time of visually guided saccades), visually guided main sequence slope (main sequence slope of visually guided saccades), antisaccade number errors (number of errors in the antisaccade task (i.e., looking at the wrong target)), antisaccade number misses (number of errors plus number of trials with no good saccade), antisaccade main sequence slope (same as above except for correct antisaccades), antisaccade reaction time (same as above but for correct antisaccades), memory guided reaction time (same as above but for memory guided), memory guided main sequence slope (same as above except for memory guided), memory guided number errors (number of errors in the antisaccade task (i.e looking at the wrong target)), and memory guided number misses (number of errors plus number of trials with no good saccade. In some examples, all visually-guided saccades, anti-saccades, and memory-guided saccade task features tasks may be used during training, during testing, or during training and testing. In other examples, any combination of any two or more of the foregoing may be used in training, or testing, or both testing and training.

Free viewing task features are free viewing saccade rate (average gain of the smooth pursuit), free viewing area (log area of ellipses containing 95% of eye positions), free viewing saccade amplitude (average amplitude of all saccades), and free viewing main sequence slope (average velocity of saccades normalized by amplitude). In some examples, all free viewing task features are used during training, during testing, or during training and testing. In other examples, any combination of any two or more of the foregoing may be used in training, or testing, or both testing and training.

Pursuit task features are pursuit gain (average gain of the smooth pursuit), pursuit saccade rate (average number of catch up saccades), and pursuit error (rms error of eye vs target). In some examples, all pursuit task features may be used during training, during testing, or during training and testing. In other examples, any combination of any two or more of the foregoing may be used in training, or testing, or both testing and training.

For a given task, in training, a subject may be given a score corresponding to a multidimensional measure of the subject's features used during that task. Such training scores may then be used to train the discriminator. A subject may have a score pertaining to all features for all tasks, all features for a subset of tasks, a subset of features for all tasks, or a subset of features for a subset of tasks. Such score is the training profile for such subject. Multiple subjects may then have corresponding training scores (i.e., profiles) entered into the discriminator. Subsequently, a subject may perform testing for a testing profile corresponding to multidimensional scoring of oculomotor features exhibited during relevant testing. A testing profile may then be compared to training profiles by a kNN discriminator. Where k=1, the training profile calculated to be closest to the testing profile is determined to be the target profile. As disclosed herein, a subject's testing profile may be correctly paired with his or her target training profile with a high degree of accuracy according to the method disclosed herein (e.g., 99.9% accuracy).

For different features within a task, different durations of tasks may be used, or only portions of such durations used, during a training session used to train a discriminator, or features exhibited over only limited portions of a testing session may be used for training and testing rather, than the full durations of training or testing sessions in which a subject participated. In some cases, where all tasks as described above are used for training and testing, features exhibited over a period of 25 minutes may be used for training and/or testing. Shorter, limited durations may also be used instead or selected from a full 25-minute duration instead for training, testing, or both, such as only 20 min, 15 min, 10 min, 5 min, 3 min, 2 min, 1 min, or less. In some examples, less than 3 minutes of features exhibited during a test may be used to train a discriminator or test a subject. In an example, only 3 min, 2.5 min, 2 min, 1.5 min, 60 sec., 30 sec., or less of a session may be used for training and/or for testing.

In some examples, a duration during which features were measured for creation of a training profile may be longer than a duration during which features are measured during testing. That is, a training session may be of any given duration and include measurements from longer durations than durations over which features are measured during testing. A testing profile compiled from a duration of feature measurements that is shorter than a duration over which comparable features were measured in compiling a training profile may be compared only with a portion of such duration of the training profile as is equivalent to the testing duration. A short testing duration may be advantageous in an example where verification of an identity of a subject or determination of whether to grant a permission to a subject may be desired with a shorter duration of measurement being required, such as where a relatively rapid determination is desired. In other examples, a training profile may be compiled from a shorter duration over which task features are measured, including for durations as stated in the preceding paragraph.

A testing profile may also include only a subset of tasks or features without requiring that all foregoing tasks or all foregoing features be included when compiling a testing profile. A testing profile may include features from any one of fixation, saccade speed, saccade accuracy, visually-guided saccades, anti-saccades, memory-guided saccades, free viewing, and pursuit. A training profile may also include only a subset of tasks or features without requiring that all foregoing tasks or all foregoing features be included when compiling a training profile. A training profile may include features from any one of fixation, saccade speed, saccade accuracy, visually-guided saccades, anti-saccades, memory-guided saccades, free viewing, and pursuit.

Where discrimination between subjects and identification of a subject is desired before permitting a subject to access secure material, information, facilities, usage of a device or computer or other sensitive material, a method and/or system as disclosed herein may be used to determine whether a subject seeking such access is a subject who previously was given permission for such access. For example, a computer system may associate permission to access such sensitive material or activity (e.g., unlocking a computing device such as a computer, phone, tablet, etc., unlocking a door or other physical barrier to a room or space or safe, starting a device such as a vehicle or other machine or robot, displaying permission-protected information on a screen such as a computer screen or other visual device for an electronic computing device or presenting audible stimuli, or enabling use of a permission-protected application on a computing device, for but some non-limiting examples). The high degree of accuracy of identification and inter-individual discrimination permitted by a system and method as disclosed herein enables tight security over such sensitive materials and access limited to specific subjects.

In another example, an individual may be identified according to a method as disclosed herein. In an example, training profiles are obtained, stored, and used to train a classifier as described above. Identities may then be attributed to the profile of one or more subject used to train the classifier. In some cases, identities may be attributed to all such subjects. In other cases, some but not all subjects' training profiles may have an identity associated with their training profile. In some cases, identities attributed to training profiles may all differ from each other and in other examples some may be the same as some other but not all. An identity may include any manner of information associated with a subject as desired, such as name, age status, rank, security level, a numerical identifier, an account number, or essentially any other characteristic intended to be associated with an individual. Subsequently, one of the subjects whose features were used to train the classifier (referred to as the test subject) may have features detected as disclosed above during a test session and a test profile for the individual compiled. The test subject's test profile may then be compared to the training profiles using a kNN classifier where, for example, k=1, and the training profile identified as closest to the test subjects test profile, with its accompanying identity, attributed to the test subject.

A system for performing a method as disclosed herein may include a device for measuring eye movements connected to a computer, such as a microprocessor, over a wired or wireless network. A computer may be connected to a server or may be accessible to local or remote computer memory storage components such as a hard drive or other such component for storing data. A computer memory storage device may further provide instructions which, when run by a microprocessor, control display of features on a monitor or other visual presentation device in a timed manner according to the above examples. Instructions may also direct a microprocessor to measure eye-movement related input received from an eye-movement measuring device during a testing session and compare a subject's eye movements during such session to a database of stored training data. For example, a microprocessor may be instructed by instructions to perform a k nearest neighbor discriminator to compare eye movements of a subject during a test session to previously stored eye movement data from a training session to determine whether eye tracking data from the subject was included in the training session data or which subject from among subjects whose eye movements are stored with the training data the test subject may correspond to.

Examples

The following examples are intended to illustrate particular embodiments of the present disclosure, but are by no means intended to limit the scope thereof.

Figure 1:
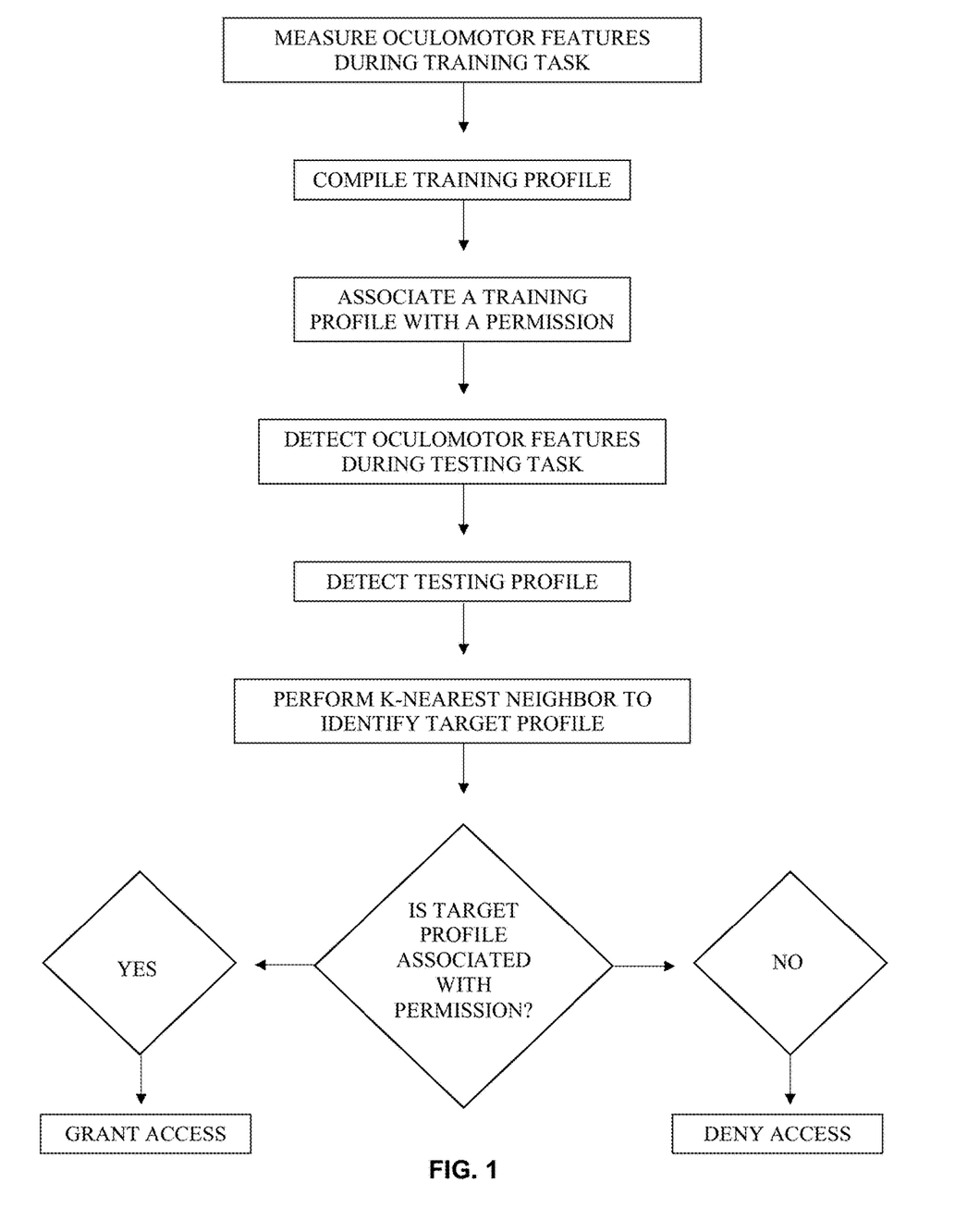
FIG. 1 is a flow diagram illustrating a method in accordance with aspects of the present disclosure.

FIG. 1 shows a flow diagram illustrating a non-limiting example of a method as disclosed herein. In this example, oculomotor features are measured as functions of eye placement and displacement over time, such as at a rate of 500 Hz. A training profile is compiled from the features detected during training and entered into a discriminator, e.g. a computer system configured to attribute a multidimensional score representing a subject's features exhibited with the number of dimensions of the score corresponding to the number of features used in determining the score. A subject's features may be from one or more tasks. A training profile is then associated with a permission. For example, a subject who has permission to access certain material may have such permission associated with his or her profile. Subsequently, to determine whether or not to permit a subject to access material, the subject may undergo a test session during which the subject's test profile is determined, being a multidimensional score corresponding to tasks constituting the test session. The test profile is then compared to the training profiles and, using a kNN discrimination, with, for example, k=1, the one nearest neighbor training profile to the subject's testing profile is selected, i.e., the target profile. If the target profile is associated with the permission, the subject is granted access. If the target profile is not associated with the permission the subject is not granted access.

Figure 2:
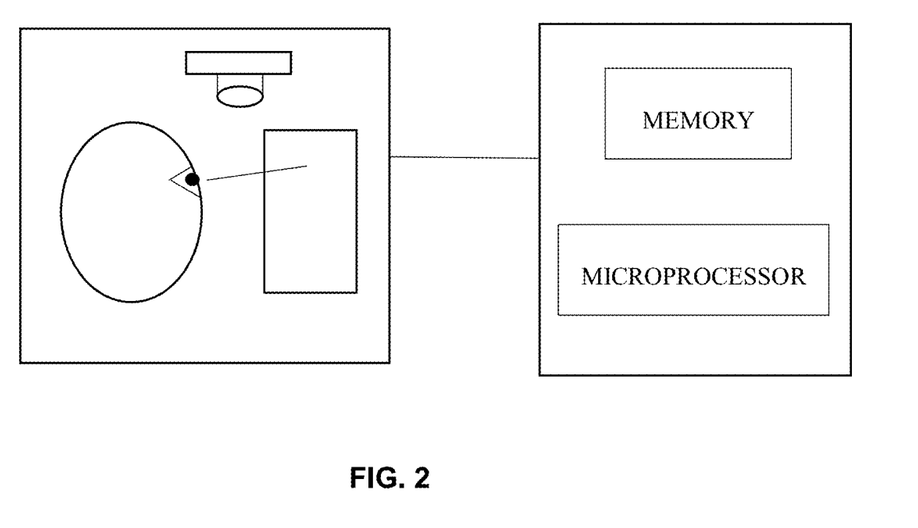
FIG. 2 is a diagram of a system in accordance with aspects of the present disclosure.

Shown in FIG. 2 is a diagrammatic representation of a system for performing a method as disclosed herein. On the left an eye tracking device is used to measure position and movements (i.e., position of each across time) of a subject's eyes during a visual task. Such positional×time measurements are used to determine oculomotor features as descried above, in accordance with the relevant task being performed during a session. On the right is shown a computer system, which may be a single computer as in this system but which also may be a wired network, wireless network, cloud-based computing system, etc., as may be appropriate for a given usage. In this example, the computer system possesses a computer readable memory in which position×time recorded by the eye-tracking device may be digitally recorded. Also included in this example is a microprocessor unit (though multiple such microprocessors may be used). A microprocessor may be configured to determine task-relevant features on the basis of position×time measurements recorded by the eye-tracking device, which may also be stored in the memory (or multiple different memories for different storage purposes may be used). Multiple subjects may undergo multiple training sessions over multiple tasks, etc., to train a discriminator by compiling training scores, i.e. training profiles, per individual session as described. Subsequently, a subject may undergo a task session for creation of a test profile much as described for creation of a training profile. Such test profile may be stored in the computer memory. A microprocessor may be configured for execution of code to perform a kNN discrimination to identify a target training profile corresponding to the testing profile, as described (e.g., k may equal one). The memory and processor may also be configured to determine whether the target profile is associated with a permission and electronically permit access to material, etc., as disclosed.

To investigate whether a subject could be identified based upon his or her eye movements, kNN when k=1 was used. In an example, all of the tasks described above with all of the features described above were used during training and testing. Matlab functions "fitcknn" and "predict" were used for training and classification, respectively. For training a classifier, in an example, Mdl=fitcknn(PredictorData,Subjects,'NumNeighbors',1,'Distance','cityblock','Standardize',1, wherein: PredictorData included a matrix of observations×predictors, used as training data, Subjects included an array that identifies a subject, such as by a unique numerical identifier, NumNeighbors included Number of nearest neighbors (for the analysis presented in this example, this is '1'), Distance included the distance metric used (for this example, this is 'cityblock'). If standardize flag set to true (such as in this example), then each column of the predictor data is centered and scaled by the column mean and standard deviation. As an output, generated was Mdl, the trained ClassificationKNN classifier. For testing of a subject, Matlab function predict was used, wherein Prediction=predict (Mdl,TestData). Mdl was the trained classifier, TestData included the data to be tested, a matrix consisting out of observations×predictors. Prediction returns a prediction (subject number) for each row of observations.

The kNN was repeatedly trained using the data from multiple sessions from 2 different subjects and the classifier was fed with a battery of variables (45 when using all oculomotor tasks), and then used to classify one held-out session performed by one of the two subjects. In detail, the following procedure was applied: 1) For any given pair of subjects, the eye movements from each session of both subjects (each subject performed 5 sessions) were characterized, yielding 10 array of variables or one array for each session; 2) The array with variables corresponding to one session was retained and later used for classification, while a second array was randomly selected and removed so that the 8 remaining arrays were evenly matched between the two participants (thus 4 each); 3) those arrays, where each element represents a dimension, were then used to train the kNN; 4) The trained kNN was then applied to classify the retained array; 5) The classification was identified as either correct or incorrect. This procedure (1 to 5) was repeated 10 times for each pair of subjects (each time retaining a different array), and because 18 subjects yield 153 possible pairs, the classification was iterated 1530 times. Finally, % accuracy was determined by the number of correct identifications divided by 1530, multiplied by 100. To determine the significance of our results, the complete analysis was run 100 times after randomly shuffling subjects and sessions with each iteration.

Figure 3:
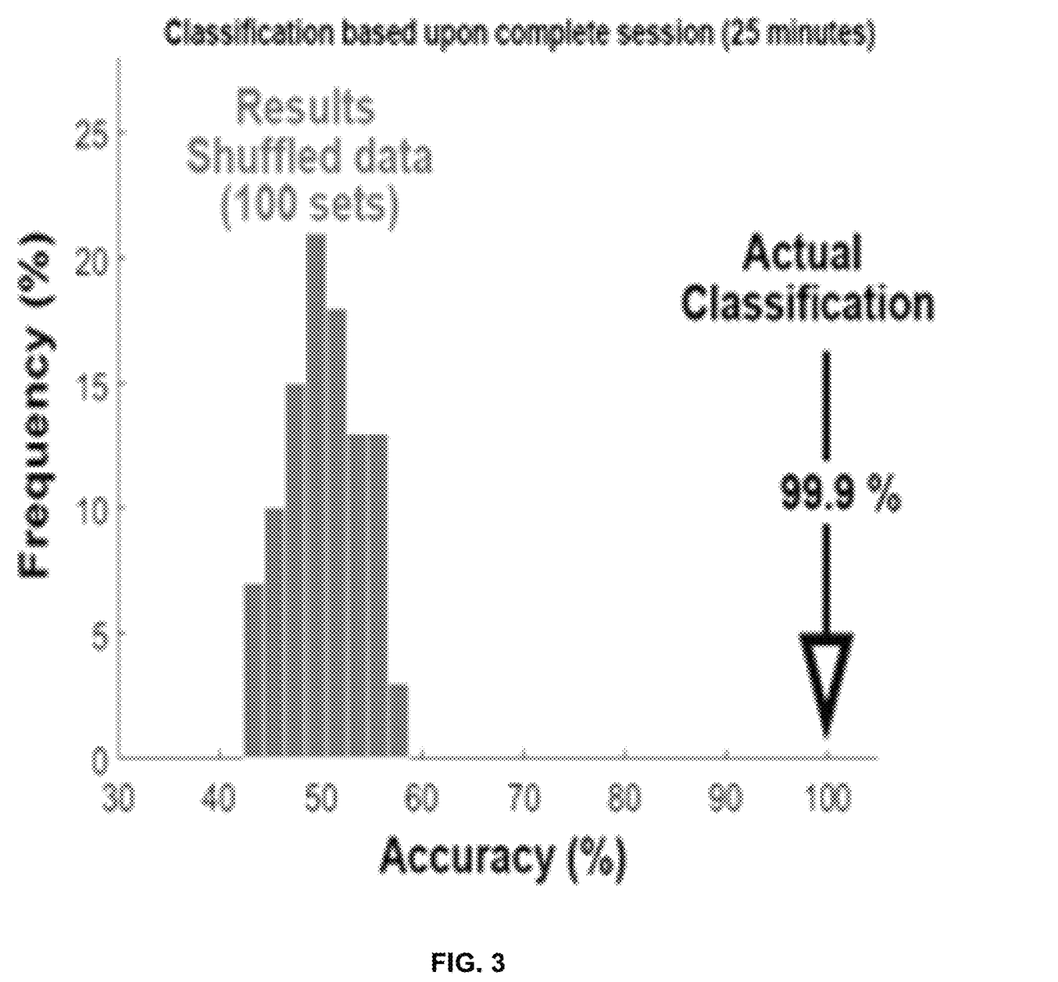
FIG. 3 is a graph showing accuracy of a method for identification of an individual in accordance with aspects of the present invention including using eight tasks in comparison to randomly shuffled training data.

FIG. 3 shows accuracy when all 8 tasks and all 45 features were used for training and testing. Actual classification for this example showed 99.9% accuracy. By comparison, using randomly shuffled data showed a distribution of accuracy no different from chance, as expected.

Figure 4:
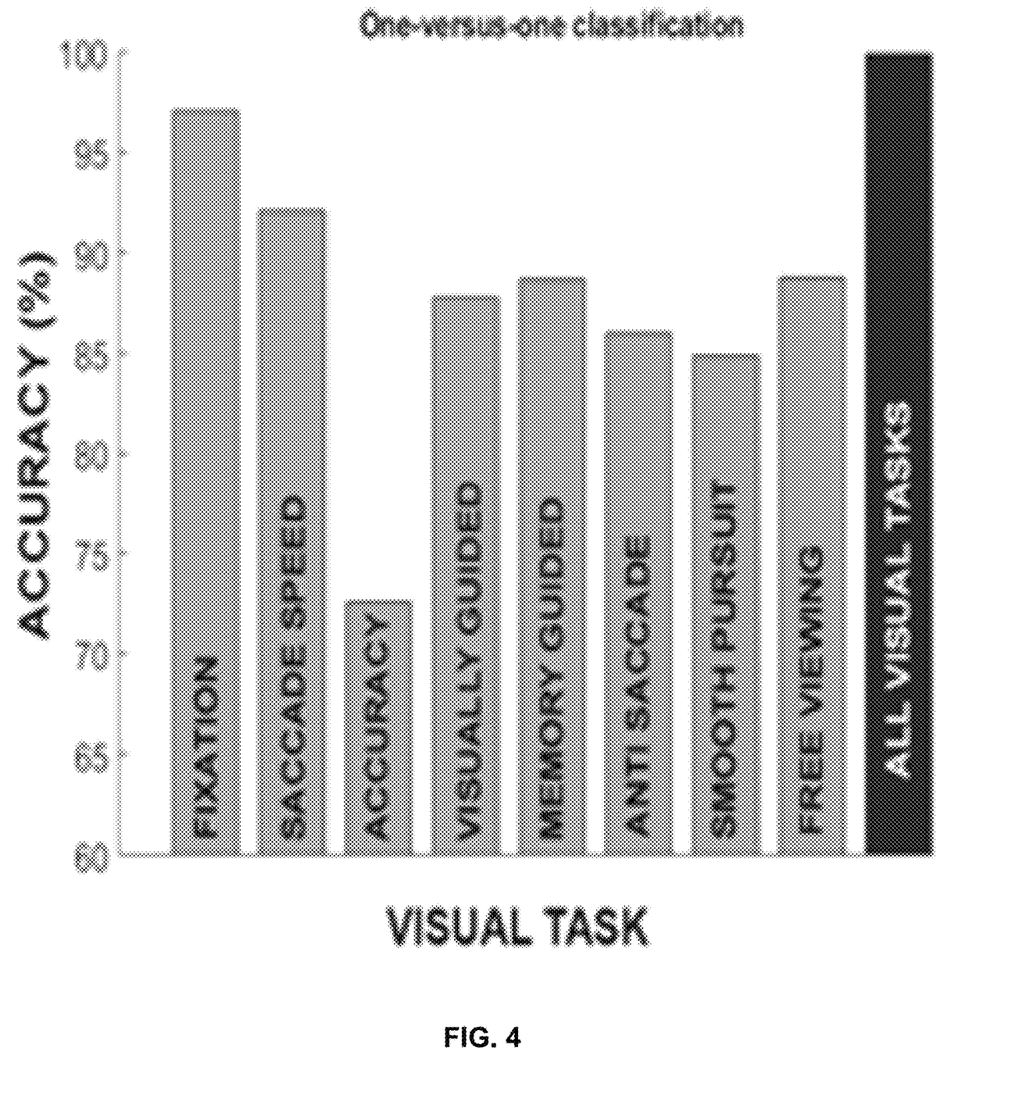
FIG. 4 is a graph showing accuracy of a method for identification of an individual in accordance with aspects of the present invention including using each of or all eight tasks.
Figure 5:
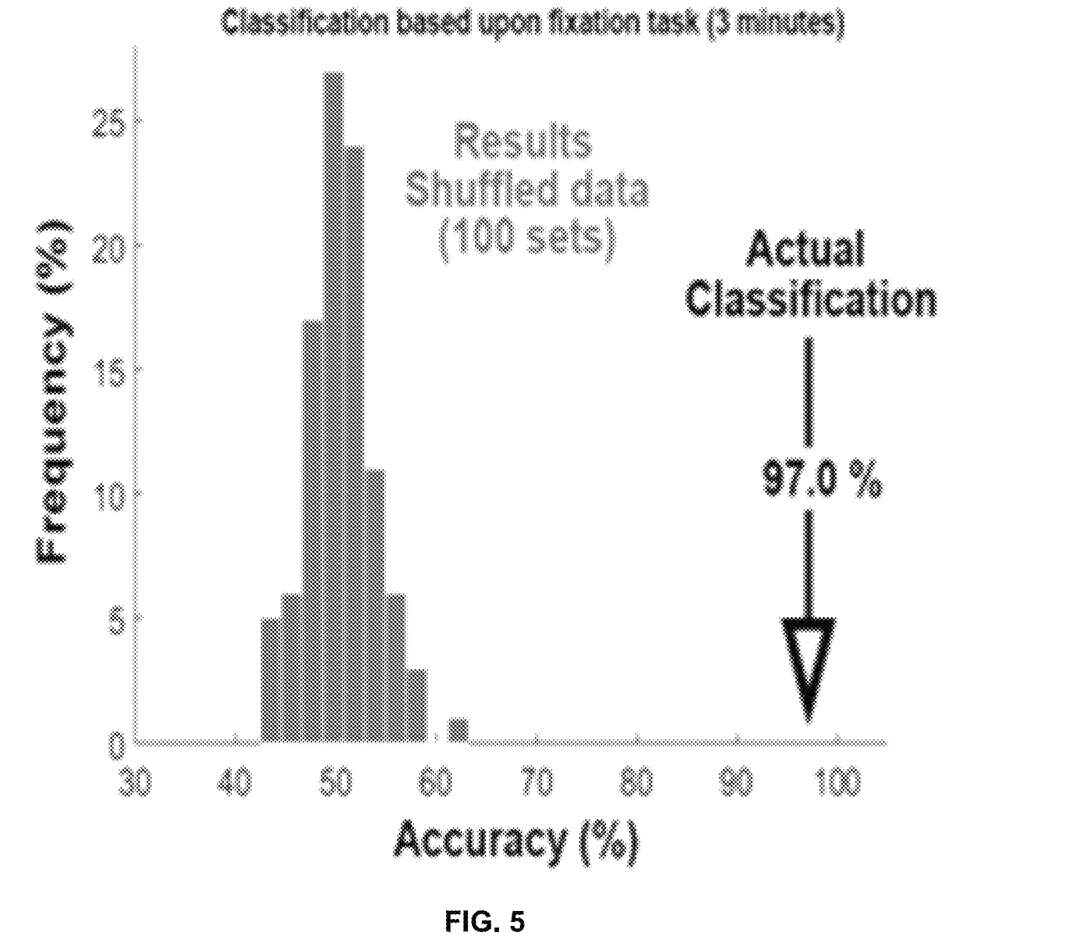
FIG. 5 is a graph showing accuracy of a method for identification of an individual in accordance with aspects of the present invention including using a three-minute fixation task.
Figure 6:
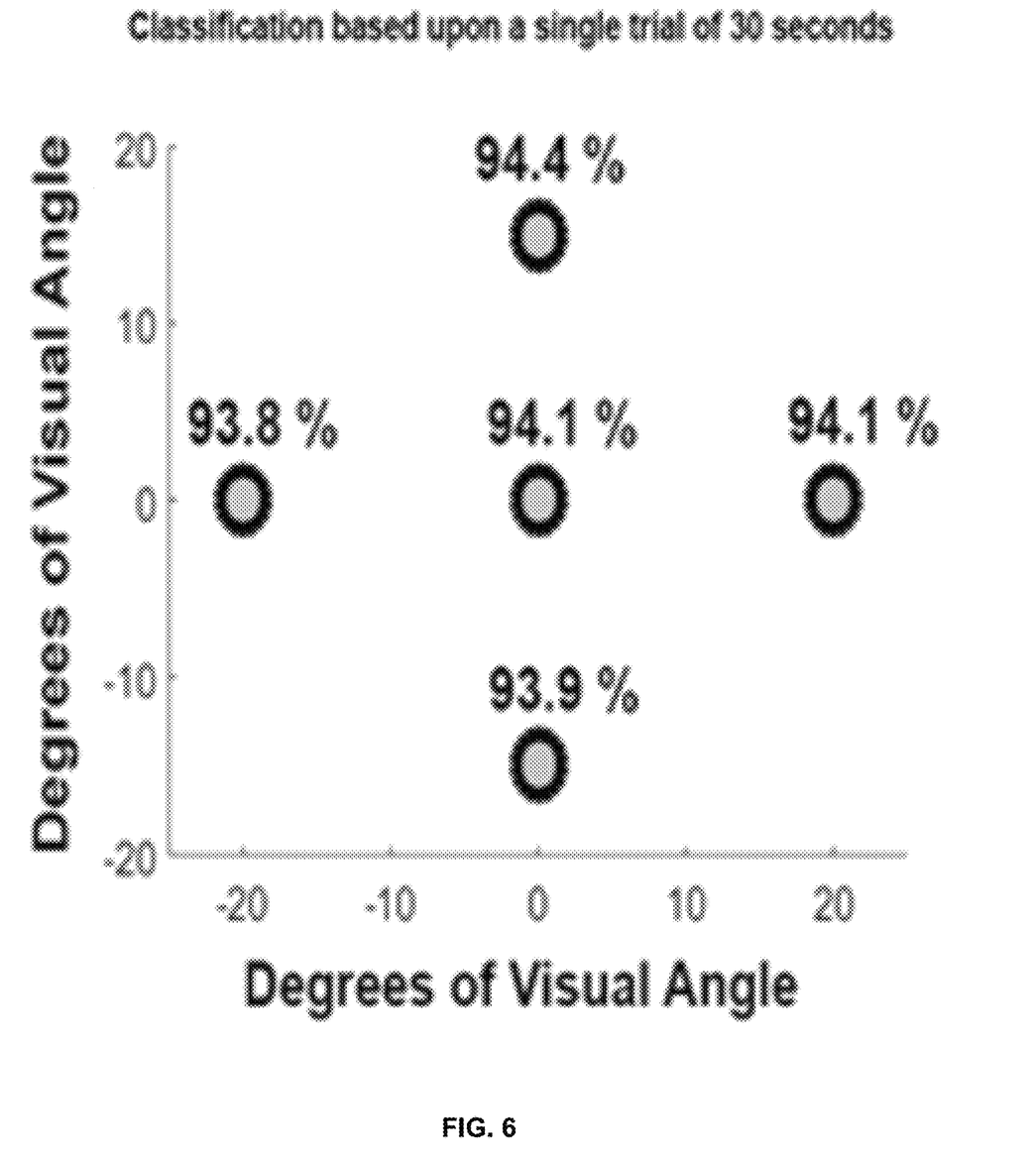
FIG. 6 is a graph showing accuracy of a method for identification of an individual in accordance with aspects of the present invention including using thirty-second fixation tasks.

FIG. 4 shows results when separated by particular tasks as compared to using all tasks. Using fixation features from fixation training and testing alone, without including features from other tasks, over a 3 min session, showed approximately 97% accuracy, nearly as accurate as using all features for all eight tasks, as represented in FIG. 5. As shown in FIG. 6, breaking fixation down into 30 second trials, with training and testing for each of only single 30-second trials used. As shown, 30 seconds of fixation testing, using fixation features, yielded an approximately 94% accuracy rate, whether fixation was at the center of the visual field, 20 degrees to the left or right thereof, or 15 degrees above or below the center of the visual field.

In another example, for each training iteration (using all eye tracking measures. one dataset from one of 18 subjects to be used as test data was withheld during training, to be used as test data after training. The remaining datasets were fed to the classifier as training data. In this one-vs-all example, a subject's test data was compared against all subjects data in the training classified to determine whether the identity of the subject could be determined. In this example, random chance would predict proper classification of the test subject as corresponding to the individual within the entire training set at 5.6%, whereas accuracy achieved, iterating over all subjects, was actually 94.7%, indicating a highly significant and powerful prediction classifier using eye movements as training as disclosed herein.

In a similar example, the same procedure was used except that instead of using all eye movement features for training and testing only fixation-related subtasks were used, from an approximately 3-minute long training/testing session. Again, whereas chance would predict only 5.6% accuracy, fixation measures provided 82% accurate subject identification from the full subject pool. Eye fixation measures showed surprisingly high power as classifier training measures. Accuracies for other subtask types were speed 61%, accuracy 14%, visual guided 33%, memory guided 42%, anti-saccade 41%, pursuit 42%, and free viewing 47%.

Smaller units of (fixation) data, which existed out of six trials of 30 seconds where the fixation point was displayed in different positions on the screen (2×middle, 1×left, 1×right, 1×top and 1×bottom), were also assessed for accuracy as training/testing data in a one-vs-all model as described. Classification of those 30 second samples yielded the following results (per position): middle 47%, left 57%, right 46%, top 59%, bottom 61%. In most cases, 30 seconds of data was therefore enough to identify the correct subject (out of 18) with a probability higher than 50%.

In an example, it was therefore possible to collect a multitude of different training data from subjects, whereas it was possible to assess only a subset of eye movement measurements to use as a prediction test, wherein the corresponding subset of the complete training data set used for the testing was used for the classifier.

Although preferred embodiments have been depicted and described in detail herein, it will be apparent to those skilled in the relevant art that various modifications, additions, substitutions, and the like can be made without departing from the spirit of the present disclosure and these are therefore considered to be within the scope of the present disclosure as defined in the claims that follow.

The invention claimed is:

1. A method of granting access, comprising
compiling a training profile of each of two or more subjects, wherein the training profile comprises one or more oculomotor features exhibited during one or more tasks,
associating a training profile of one of the two or more subjects with a permission,
detecting a testing profile of one of the two or more subjects, wherein the testing profile comprises one or more of the one or more oculomotor features exhibited during one or more of the one or more tasks,
identifying a target profile, wherein the target profile is the training profile of the one or more subjects closest to the testing profile, wherein identifying comprises performing a k-nearest neighbor analysis and k=1, and
granting access if and only if the target profile is associated with a permission,
wherein the one or more tasks are selected from the group consisting of fixation, saccade speed, saccade accuracy, visually-guided saccades, anti-saccades, memory-guided saccades, free viewing, pursuit, and any combination of two or more of the foregoing, and
detecting comprises observing features wherein features are selected from the group consisting of one or any combination of two or more fixation features if one of the one or more tasks comprises fixation, one or any combination of two or more saccade speed features if one of the one or more tasks comprises saccade speed, one or any combination of two or more saccade accuracy features if one of the one or more tasks comprises saccade accuracy, one or any combination of two or more visually-guided saccades features if one of the one or more tasks comprises visually-guided saccades, one or any combination of two or more anti-saccades features if one of the one or more tasks comprises anti-saccades, one or any combination of two or more memory-guided saccades features if one of the one or more tasks comprises memory-guided saccades, one or any combination of two or more free viewing features if one of the one or more tasks comprises free viewing, one or any combination of two or more pursuit features if one of the one or more tasks comprises pursuit, and any combination of two or more of the foregoing.

2. The method of claim 1, wherein one or more of the tasks comprises fixation.

3. The method of claim 2, wherein the task has a testing duration and the testing duration is between one minute and three minutes.

4. The method of claim 2, wherein the task has a testing duration and the testing duration is between thirty seconds and one minute.

5. The method of claim 2, wherein the task has a testing duration and the testing duration is between ten seconds and thirty seconds.

6. The method of claim 2, wherein the task has a testing duration and the testing duration is between two seconds and ten seconds.

7. The method of claim 1, wherein one or more of the tasks comprises saccade speed.

8. The method of claim 7, wherein each of the one or more tasks has a training duration and a testing duration and the training duration and the testing duration of one or more of the tasks is between two seconds and three minutes.

9. The method of claim 7, wherein the task has a testing duration and the testing duration is between one minute and three minutes.

10. The method of claim 7, wherein the task has a testing duration and the testing duration is between thirty seconds and one minute.

11. The method of claim 1, wherein one or more of the tasks comprises saccade accuracy.

12. The method of claim 1, wherein one or more of the tasks comprises visually-guided saccades.

13. The method of claim 1, wherein one or more of the tasks comprises anti-saccades.

14. The method of claim 1, wherein one or more of the tasks comprises memory guided saccades.

15. The method of claim 1, wherein one or more of the tasks comprises free viewing.

16. The method of claim 1, wherein one or more of the tasks comprises pursuit.

17. The method of claim 1 wherein the one or more tasks comprise fixation, saccade speed, saccade accuracy, visually-guided saccades, anti-saccades, memory-guided saccades, free viewing, and pursuit.

18. The method of claim 1, wherein each of the one or more tasks has a training duration and a testing duration and the training duration and the testing duration of one or more of the tasks is between two seconds and three minutes.

19. The method of claim 18, wherein granting access comprises unlocking a computing device, unlocking a door, starting a device, displaying permission-protected information on a screen, or enabling use of a permission-protected application on a computing device.

20. The method of claim 1, wherein granting access comprises unlocking a computing device, unlocking a door, starting a device, displaying permission-protected information on a screen, or enabling use of a permission-protected application on a computing device.

21. A method of attributing an identity to a subject, comprising
compiling a training profile of each of a test subject and one or more training subjects, wherein each training profile comprises one or more oculomotor features exhibited by the each of the test subject and the one or more training subjects during one or more tasks,
associating each of the training profiles of the test subject and one or more training subjects with an identity,
detecting a testing profile of the test subject, wherein the testing profile comprises one or more of the one or more oculomotor features exhibited during one or more of the one or more tasks,
identifying a target profile, wherein the target profile is the training profile of the test subject and one or more training subjects closest to the testing profile, wherein identifying comprises performing a k-nearest neighbor analysis and k=1, and
attributing the identity associated with the target profile with the test subject,
wherein the one or more tasks are selected from the group consisting of fixation, saccade speed, saccade accuracy, visually-guided saccades, anti-saccades, memory-guided saccades, free viewing, pursuit, and any combination of two or more of the foregoing, and
detecting comprises observing features wherein features are selected from the group consisting of one or any combination of two or more fixation features if one of the one or more tasks comprises fixation, one or any combination of two or more saccade speed features if one of the one or more tasks comprises saccade speed, one or any combination of two or more saccade accuracy features if one of the one or more tasks comprises saccade accuracy, one or any combination of two or more visually-guided saccades features if one of the one or more tasks comprises visually-guided saccades, one or any combination of two or more anti-saccades features if one of the one or more tasks comprises anti-saccades, one or any combination of two or more memory-guided saccades features if one of the one or more tasks comprises memory-guided saccades, one or any combination of two or more free viewing features if one of the one or more tasks comprises free viewing, one or any combination of two or more pursuit features if one of the one or more tasks comprises pursuit, and any combination of two or more of the foregoing.

* * * * *